United States Patent [19]
Horiguchi et al.

[11] Patent Number: 5,937,186
[45] Date of Patent: Aug. 10, 1999

[54] ASYNCHRONOUS INTERRUPT SAFING OF PROLOGUE PORTIONS OF COMPUTER PROGRAMS

[75] Inventors: Tsuneo Horiguchi, San Jose, Calif.; Richard Tallman, Saurgerties, N.Y.

[73] Assignee: International Business Machines Corporation, Armonk, N.Y.

[21] Appl. No.: 08/714,494

[22] Filed: Sep. 16, 1996

Related U.S. Application Data

[63] Continuation of application No. 08/216,935, Mar. 24, 1994, abandoned.

[51] Int. Cl.$^6$ ............................. G06F 13/14; G06F 13/24
[52] U.S. Cl. ......................... 395/591; 395/733; 395/734; 395/735; 395/736
[58] Field of Search ........................... 711/220; 395/733, 395/734, 735, 736, 740, 378, 591

[56] References Cited

U.S. PATENT DOCUMENTS

| | | | |
|---|---|---|---|
| 4,486,831 | 12/1984 | Wheatley et al. | 395/670 |
| 5,388,263 | 2/1995 | Ellis et al. | 395/704 |
| 5,418,968 | 5/1995 | Gobeli | 395/733 |

OTHER PUBLICATIONS

The Institute of Electrical and Electronics Engineers, Inc., IEEE Standards Interpretations for IEEE Std 1003.1–1990 and IEEE Std 2003.1–1992, Oct. 1994 Edition.

The Institute of Electrical and Electronics Engineers, Inc., Information technology—Portable Operating System Interface (POSIX) Part 1: System Application Program Interface (API) [C Language], First Edition 1990–12–07.

The Institute of Electrical and Electronics Engineers, Inc., Portable Operating System Interface ( POSIX) Part 1: System Application Program Interface [API]Amendment 1: Realtime Extension [C Language], 1994.

*Primary Examiner*—Jack A. Lane
*Attorney, Agent, or Firm*—Marilyn Smith Dawkins; Sterne, Kessler, Goldstein & Fox, P.L.L.C.

[57] ABSTRACT

Processing an asynchronous interrupt of a processing entity which executes in a computer system is disclosed. An invocation stack is maintained in the computer system. The invocation stack includes a plurality of stack frames, wherein each of the stack frames has a fixed part of a predetermined length and a variable part of a variable length. An interrupt service routine is pre-defined to service the asynchronous interrupt. Processing of the asynchronous interrupt is performed by determining an address of a next available memory location in the invocation stack. A starting address in the invocation stack for a new stack frame is determined by adding a predetermined "skip" value to the next available memory location address. The new stack frame is to be used by the interrupt service routine. Then, a portion of the invocation stack starting from the starting address is allocated for the new stack frame, and the new stack frame is generated in the invocation stack using the allocated portion of the invocation stack.

16 Claims, 9 Drawing Sheets

ASYNCHRONOUS INTERRUPT SAFING OF PROLOGUE PORTIONS OF COMPUTER PROGRAMS

CROSS-REFERENCE TO OTHER APPLICATIONS

This application is a continuation of application Ser. No. 08/216,935, filed Mar. 24, 1994 now abandoned.

The following application of common assignee contains some common disclosure, and is believed to have an effective filing date identical with that of the present application:

U.S. Patent Application entitled "System and Method for Safing of Asynchronous Interrupts", by Tsuneo Horiguchi, Eric L. Porter, and Rick Tallman, incorporated herein by reference in its entirety.

DESCRIPTION

1. Technical Field

The present invention relates to systems and methods for processing asynchronous interrupts such that the prologue portions of computer programs may be interrupted by such asynchronous interrupts without disruption.

2. Background Art

Figure 1A:
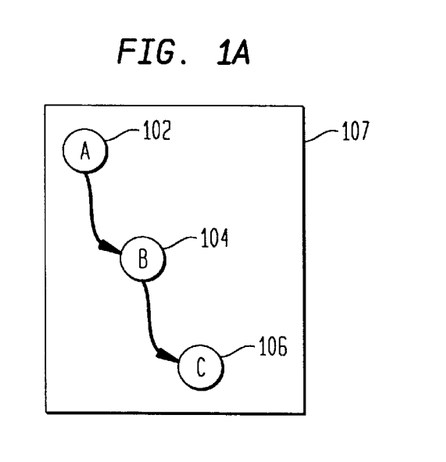
FIGS. 1A and 1C illustrate example function invocation sequences and FIGS. 1B and 1D illustrate invocation stacks associated with the function invocation sequences of FIGS. 1A and 1C, respectively.

FIG. 1A illustrates an example function invocation sequence of a computer program 107 where a function A 102 has invoked a function B 104. Function B 104 has, in turn, invoked a function C 106. Functions A 102, B 104, and C 106 are part of the computer program 107.

Figure 1B:
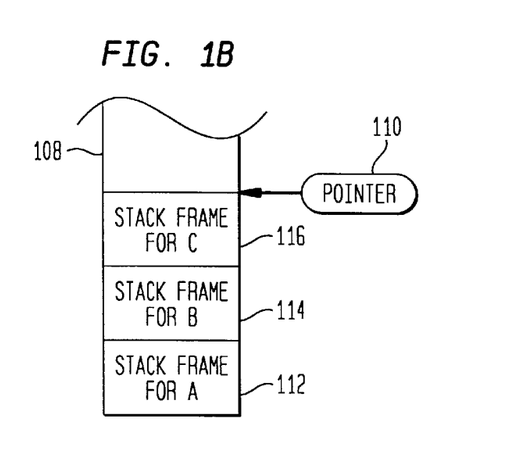

Conventionally, an invocation stack is associated with each computer program. An invocation stack is a last-in-first-out (LIFO) stack. The elements of an invocation stack are called stack frames. Each stack frame is associated with an invocation of a function. For example, FIG. 1B illustrates an invocation stack 108 which is associated with the invocation sequence of FIG. 1A. The invocation stack 108 includes stack frames 112, 114, and 116 for the invocations of functions A 102, B 104, and C 106, espectively. The stack frame 116 for function C 106 is at the top of the invocation stack 108, as indicated by a stack pointer 110.

Figure 1C:
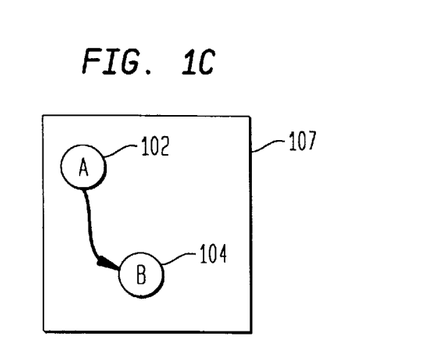
Figure 1D:
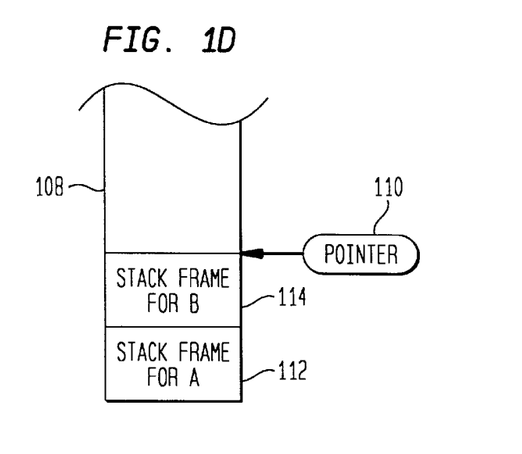

A stack frame is added to an invocation stack when a function is invoked. Similarly, a stack frame associated with a function is removed from the invocation stack when the function returns to its caller. This is shown, for example, in FIGS. 1C and 1D, where the stack frame 116 for function C 106 has been removed from the invocation stack 108 after function C 106 has returned to its caller, function B 104.

A function uses its stack frame to store its dynamic variables. Also, when one function (referred to as the "calling" function) calls another function (referred to as the "called" function), the state of the calling function is stored in its stack frame. For example, in FIGS. 1A and 1B, when function B 104 calls function C 106, the state of function B 104 is stored in the stack frame 114 associated with function B 114.

Conventionally, the called function is responsible for saving the state of the calling function in the calling function's stack frame. In particular, each function includes a portion of code called the "prologue" portion. The prologue portion is typically automatically appended to a function by a compiler during compilation. When a function is invoked, the function's prologue portion is executed before any other code of the function is executed.

The prologue portion of a called function performs two functions when the called function is invoked by a calling function. First, the prologue portion stores the state of the calling function in the calling function's stack frame. Second, the prologue portion creates a new stack frame for the called function in the invocation stack. Note that the same invocation stack is used to store the stack frame for the calling function and the stack frame for the called function. For example, in FIGS. 1A and 1B, when function B 104 calls function C 106, the prologue portion (not shown) of function C 106 saves the state of function B 104 in the stack frame 114 associated with function B 114. Also, the prologue portion creates a new stack frame (that is, the stack frame 116) for function C 106.

Generally, a function's prologue portion cannot be safely interrupted by asynchronous events (the terms "asynchronous event" and "asynchronous interrupt" are used interchangeably herein). In particular, a prologue portion cannot be interrupted by an asynchronous event without possibly disrupting or destroying the stack frame that was being created by the interrupted prologue portion. In other words, a prologue portion cannot be interrupted by an asynchronous event without possibly compromising the integrity of the invocation stack.

Figure 2:
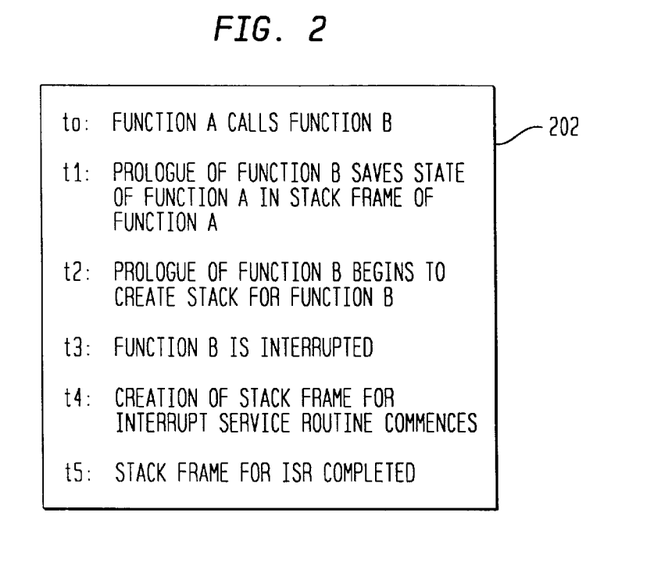
FIG. 2 is an example execution timeline associated with the invocation sequence of FIG. 1A.

Consider, for example, an execution timeline 202 shown in FIG. 2 (note that the times t0–t5 shown in FIG. 2 are not necessarily regularly spaced). This execution timeline 202 corresponds to the function invocation sequence of the program 107 shown in FIG. 1A. Snapshots of the invocation stack 108 associated with the program 107 in accordance with the execution timeline 202 are shown in FIGS. 3A–3D.

Figure 3A:
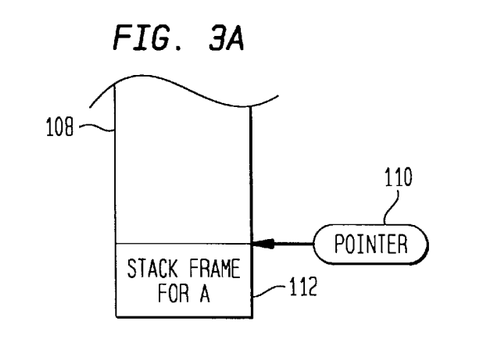
FIGS. 3A–3D are used to illustrate the problem addressed by the present invention and depicts the state of an invocation stack at instances of time defined by the execution timeline of FIG. 2.

At a time t0, function A 102 calls function B 104. At the end of time t0, the invocation stack 108 of the program 107 is as shown in FIG. 3A, wherein the stack frame 112 of function A 102 is at the top of the invocation stack 108 (as indicated by the stack pointer 110).

At a time t1, the prologue portion (not shown) of function B 104 saves the state of function A 102 in the stack frame 112 of function A 102.

Figure 3B:
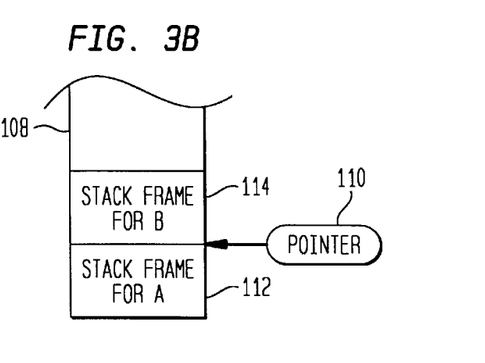

At a time t2, the prologue portion of function B 104 begins to create a new stack frame (that is, stack frame 114) in the invocation stack 108 for function B 104. At the end of time t2, the invocation stack 108 of the program 107 is as shown in FIG. 3B, wherein the stack frame 114 of function B 104 has been added to the invocation stack 108. Note, however, that the prologue portion of function B 104 has not completed the creation of the stack frame 114 and, thus, the stack pointer 110 still indicates that the stack frame 112 of function A 102 is at the top of the invocation stack 108.

At a time t3, the prologue portion of function B 104 is interrupted by an asynchronous event (not shown). Assume that such asynchronous events are handled by an interrupt service routine (ISR), not shown.

Figure 3C:
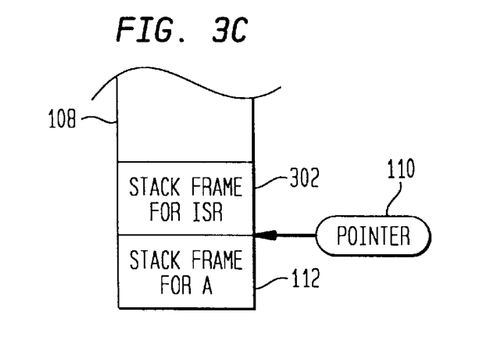

At a time t4, creation of a new stack frame 302 in the invocation stack 108 for use by the ISR commences. At the end of time t4, the invocation stack 108 of the program 107 is as shown in FIG. 3C, wherein the stack frame 302 for the ISR has been added to the invocation stack 108. Note that the ISR's stack frame 302 is allocated storage in the invocation stack 108 starting from the top of the invocation stack 108 as indicated by the stack pointer 110.

Figure 3D:
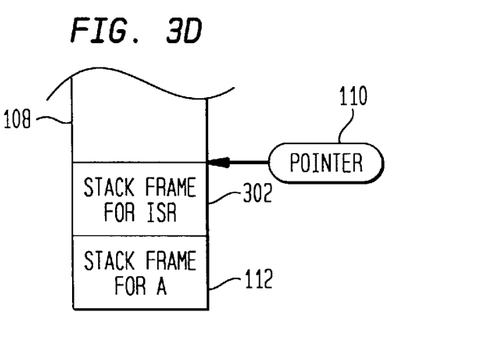

At a time t5, creation of the ISR's stack frame 302 is completed. At the end of time t5, the invocation stack 108 of the program 107 is as shown in FIG. 3D, wherein the stack pointer 302 has been modified to denote the ISR's stack frame 302 as the top of the invocation stack 108.

Since, at time t4, the ISR's stack frame 302 is allocated storage in the invocation stack 108 starting from the top of the invocation stack 108 (as indicated by the stack pointer 110), the partially completed stack frame 114 of function B 104 is overwritten. Thus, the asynchronous interruption of the prologue portion of function B 104 results in the destruction of the stack frame 114 that was being created by this interrupted prologue portion. In other words, the asynchronous interruption of the prologue portion of function B 104 results in the invocation stack 108 being compromised.

Therefore, what is required is a system and method for processing asynchronous interrupts such that prologue portions of functions in a computer program may be asynchronously interrupted without compromising the invocation stack associated with the computer program.

DISCLOSURE OF INVENTION

The present invention is directed to a system and method for processing an asynchronous interrupt of a processing entity (such as a thread, described below) which executes in a computer system. An invocation stack is maintained in the computer system. The invocation stack includes a plurality of stack frames, wherein each of the stack frames has a fixed part of a predetermined length and a variable part of a variable length. An interrupt service routine is pre-defined to service the asynchronous interrupt.

The present invention operates by determining an address of a next available memory location in the invocation stack. A starting address in the invocation stack for a new stack frame is determined by adding a predetermined "skip" value to the next available memory location address. The new stack frame is to be used by the interrupt service routine. Then, a portion of the invocation stack starting from the starting address is allocated for the new stack frame, and the new stack frame is generated in the invocation stack using the allocated portion of the invocation stack.

The foregoing and other objects, features and advantages of the invention will be apparent from the following more particular description of preferred embodiments of the invention, as illustrated in the accompanying drawings.

BRIEF DESCRIPTION OF DRAWINGS

The present invention will be described with reference to the accompanying drawings, wherein:

FIGS. 1A–1D are used to describe "invocation stacks" and "stack frames," wherein

BEST MODE FOR CARRYING OUT THE INVENTION

1. Overview of the Present Invention

The present invention is directed to a system and method for processing asynchronous interrupts such that prologue portions of functions in a computer program may be asynchronously interrupted without compromising the invocation stack associated with the computer program. In particular, the present invention is directed to a system and method for processing asynchronous interrupts such that prologue portions of functions may be asynchronously interrupted without destroying the stack frames being created by the prologue portions before their interruption.

Figure 6:
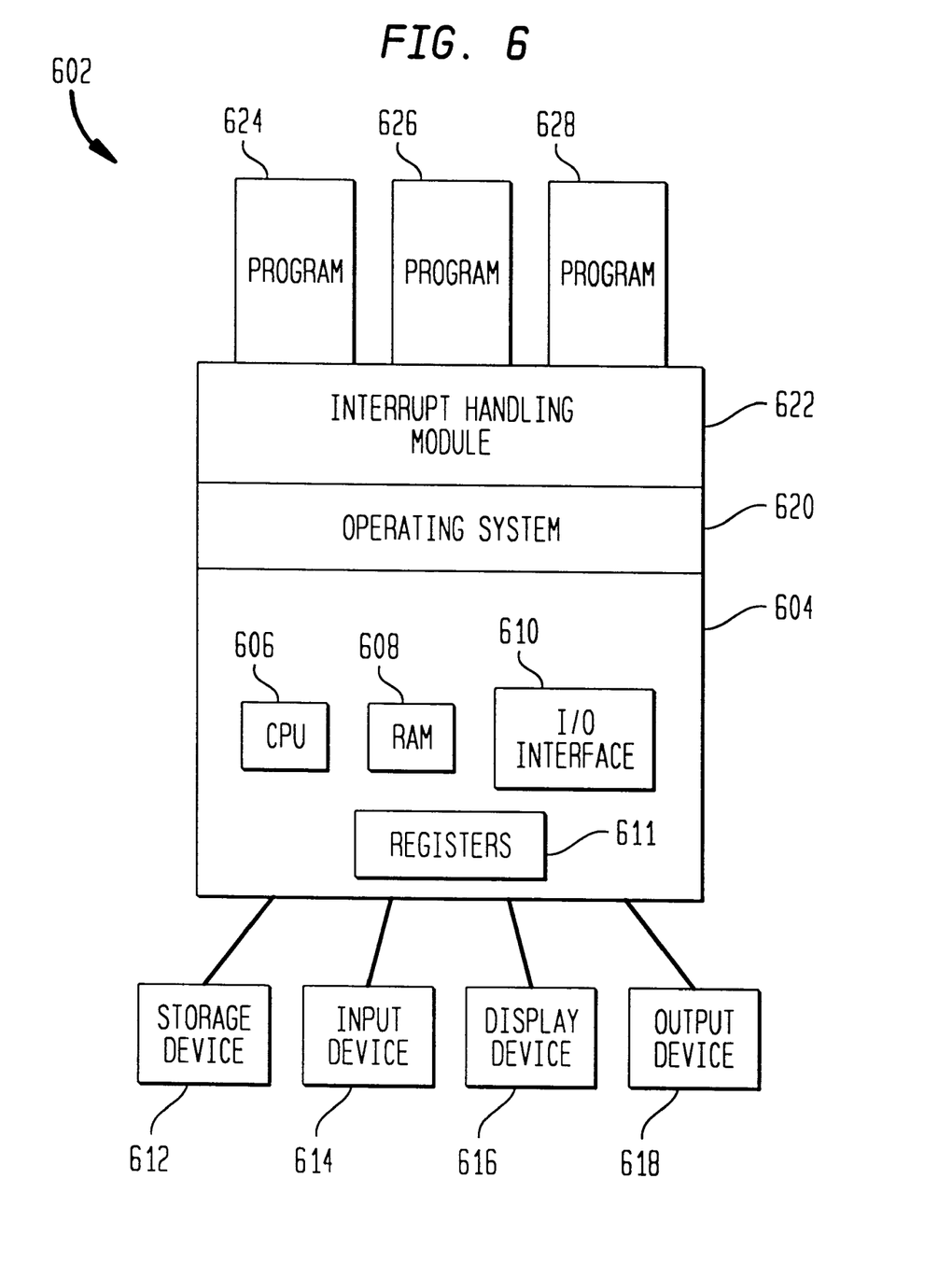
FIG. 6 is a block diagram of a computer system according to an embodiment of the present invention.

FIG. 6 is a block diagram of a computer system 602 according to an embodiment of the present invention. The computer system 602 includes hardware components 604 such as one or more central processing units (CPUs) 606, a random access memory (RAM) 608, an input/output (I/O) interface 610, and a plurality of registers 611. The registers 611 are used to store data and could be part of the CPU 606. The RAM 608 is used to store, for example, invocation stacks associated with processes. The computer system 602 also includes an operating system 620. Application programs 624, 626, and 628 preferably execute in parallel in the computer system 602. Various peripheral devices may be connected to the computer system 602, such as secondary storage devices 612 (such as hard disk drives), input devices 614 (such as keyboards and pointing devices), display devices 616 (such as monitors), and output devices 618 (such as printers).

The computer system 602 also includes an interrupt handling module 622. Preferably, the interrupt handling module 622 implements the method of the present invention as described herein.

The interrupt handling module 622 can be implemented in any number of ways. For example, the interrupt handling module 622 can be implemented as an extension of the operating system 620 (in which case the interrupt handling module 622 would be part of the operating system 620). Alternatively, the interrupt handling module 622 can be embedded in the run-time environment (not shown) of the application programs 624, 626, 628 which execute in the computer system 602. Alternatively, the interrupt handling module 622 can be implemented as an extension of a combination of the operating system 620 and the run-time environment. The interrupt handling module 622 could also be implemented as an application program which executes in the computer system 602, such as application program 628. These and other implementations of the interrupt handling module 622 will be apparent to persons skilled in the relevant art based on the description of the interrupt handling module 622 contained herein.

A computer program product comprising a computer readable media having computer program logic recorded thereon, wherein the computer program logic when executed in the computer system 602 enables the computer system 602 to implement the method of the present invention, may be read by and stored on the secondary storage device 612. The computer program logic may then be loaded into the RAM 608, and executed by the CPU 606 of the computer system 602. When executing in the CPU 606, the computer program logic is represented by the interrupt handling module 622.

The system of the present invention is represented by the computer system 602 having the interrupt handling module 622 either as part of or distinct from the operating system 620. Alternatively, the system of the present invention is represented by the interrupt handling module 622 alone. Or, the system of the present invention is represented by the computer program product. Other representations of the present invention will be apparent to persons skilled in the relevant art based on the discussion contained herein.

Preferably, the computer system 602 is the well known System/390 family of computers produced by International Business Machines (IBM) Corporation of Armonk, N.Y. Preferably, a run-time environment is established in the computer system 602 using the well known SAA AD/Cycle Language Environment/370 produced by IBM (SAA stands for Systems Application Architecture; AD stands for Application Development). However, it should be understood that other computers and/or run-time environments could alternatively be used in the computer system 602 without departing from the scope and spirit of the present invention. System/390, SAA, and AD/Cycle are registered trademarks of International Business Machines Corporation.

2. Overview of the POSIX Operating System Interface Standard

An operating system interface standard is a specification that defines the interface between operating systems which conform to the standard and application programs which are written to comply with the standard. Operating system interface standards are advantageous for a number of reasons, including enhanced portability. For example, applications which conform to an operating system interface standard are theoretically portable at the source code level to all computer systems having operating systems which conform to the standard.

Operating system interface standards differ from computer programming language standards. A computer programming language standard is a specification which defines the syntax and operation of a computer programming language. Various computer programming language standards exist, such as the ANSI and ISO standards for the C, COBOL, Fortran, and PL/1 computer programming languages. The application programs 624, 626, 628 which execute in the computer system 602 in FIG. 6 each includes components which conform to one or more of these computer programming language standards.

Preferably, the operating system 620 in the computer system 602 is one which conforms to the Portable Operating System Interface (POSIX) standard. The POSIX standards relevant to the present invention are defined in terms of the well known C computer programming language. POSIX, which is a UNIX based operating system interface standard, is described in many publicly available documents, such as *Information Technology-Portable Operating System Interface (POSIX)-Part 1: System Application Program Interface (API) (C Language)*, published by the Institute of Electrical and Electronics Engineers, International Standard ISO/IEC 99450-1:1990, IEEE Standard 1003.1-1990, 1990, and *Draft Standard for Information Technology-Portable Operating System Interface (POSIX)-Part 1: System Application Program Interface (API)-Amendment 2: Threads Extension (C Language)*, published by the Institute of Electrical and Electronics Engineers, IEEE Standard P1003.4a/D8, 1993, which are herein incorporated by reference in their entireties.

Specifically, the operating system 620 is preferably the well known MVS/ESA (Multiple Virtual Storage System/Enterprise Systems Architecture) operating system produced by IBM. It should be understood, however, that other operating systems based on other operating system interface standards could alternatively be used without departing from the scope and spirit of the present invention. In particular, other UNIX based standards, specifications, or implementations could alternatively be used. MVS/ESA is a trademark of International Business Machines Corporation. UNIX is a registered trademark of American Telegraph and Telephone (AT&T).

Features of POSIX which are relevant to the present invention shall now be generally described. These features of POSIX are well known. They are discussed below for the convenience of the reader.

POSIX supports the following program execution constructs: processes and threads. A process is defined as including an address space, one or more threads that execute within that address space, and the system resources required by the threads. An application program includes one or more processes. A thread is defined as being a single flow of control within a process. Each thread has its own required resources to support its flow of control.

A signal (also called conditions, exceptions, and errors) is an interprocess message that is typically transferred via an interprocess communication (IPC) mechanism to a thread (called the receiving thread) of a process. The signal may originate from an entity that is external to the receiving thread (such as another thread or the operating system 620), or may originate from the receiving thread itself. An example of a signal is a "Divide By Zero" signal, which is sent to a thread when the thread attempts to perform a division operation with the divisor equal to zero.

POSIX supports a particular set of signals (such signals are called POSIX signals), and defines particular semantics for handling POSIX signals. Such semantics are called "POSIX signal handling semantics".

According to the POSIX signal handling semantics, signals are defined as being asynchronous. In contrast, traditional language signal handling semantics define signals as being synchronous. Asynchronous signals can best be described by first describing synchronous signals.

A synchronous signal is one whose origin can be attributed to a specific thread (this is called the originating thread), wherein the originating thread and the receiving thread (that is, the thread which received the signal from the originating thread) execute synchronously. In other words, with synchronous signals, the execution of the originating thread is suspended while the receiving thread is processing the signal.

These assumptions pertaining to synchronous signals do not apply to asynchronous signals. In particular, the execution of the originating thread is not suspended while the receiving thread is processing the signal. In contrast, with asynchronous signals, the originating thread and the receiving thread may execute in parallel.

A POSIX asynchronous signal represents an asynchronous event. As discussed above, conventionally a function's prologue portion cannot be safely interrupted by asynchronous events, such as POSIX asynchronous signals. Such asynchronous interruption of a prologue portion might conventionally result in destroying the stack frame that was being created by the prologue portion. The interrupt handling module 622 of the present invention processes asynchronous events, such as POSIX asynchronous signals, such that interruption of prologue portions by such asynchronous events does not destroy the stack frames being created by the prologue portions. The operation of the interrupt handling module 622 is discussed below.

3. Relevant Characteristics of Invocation Stacks, Stack Frames, and Prologue Portions of Functions Before proceeding further, it will be useful to consider characteristics of invocation stacks, stack frames, and function prologue portions that are relevant to the present invention.

Figure 4:
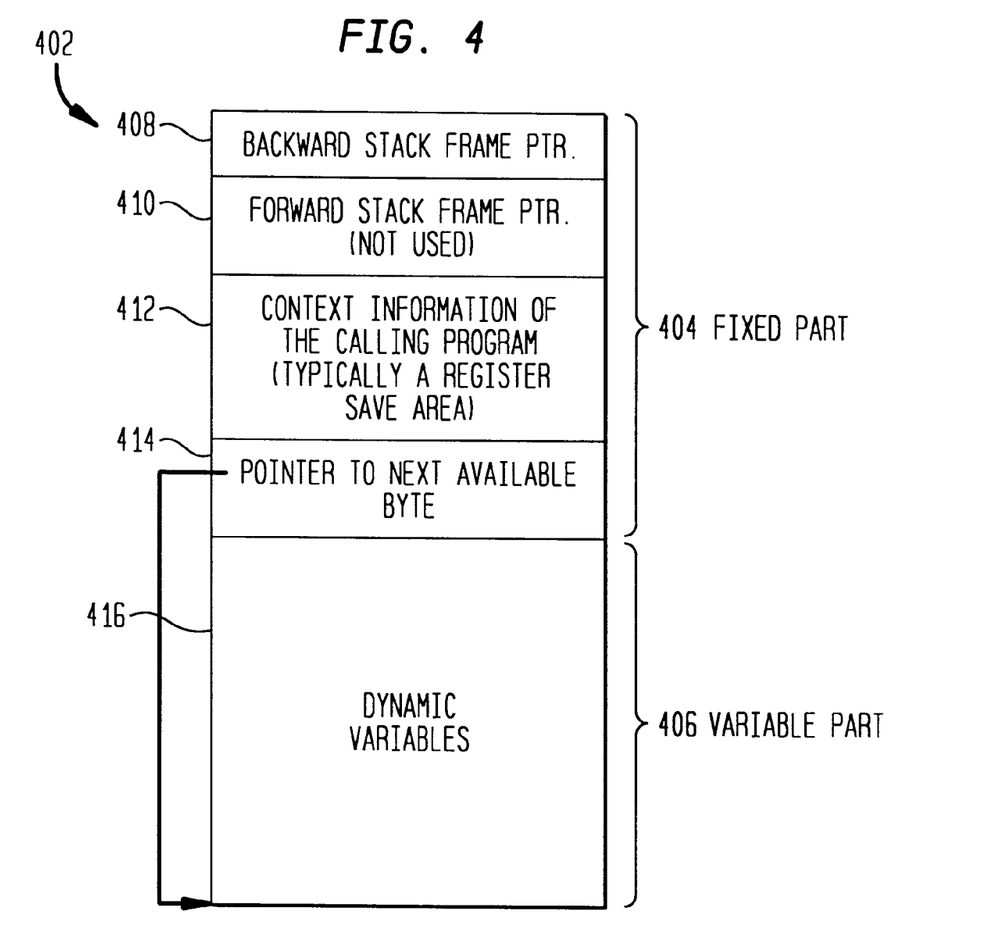
FIG. 4 illustrates the detailed format of a stack frame according to a preferred embodiment of the present invention.

FIG. 4 depicts a stack frame 402 according to a preferred embodiment of the present invention. The stack frame 402 includes a segment having a predetermined, fixed length (this segment is called the fixed part 404) and a segment whose length varies from function to function (this segment is called the variable part 406).

The fixed part 404 includes a backward stack frame pointer field 408 and a forward stack frame pointer field 410. These fields 408 and 410 are used to chain the stack frame 402 to the two stack frames in the invocation stack that respectively precede and follow the stack frame 402. In particular, the backward stack frame pointer field 408 stores the starting address (called the backward pointer) of the stack frame which precedes the stack frame 402 in the invocation stack. The forward stack frame pointer field 410 stores the starting address (called the forward pointer) of the stack frame which follows the stack frame 402 in the invocation stack.

The fixed part 404 also includes a register save area (RSA) 412 which is used to store information pertaining to the state of the function (referred to as the calling function) associated with the stack frame 402 when the calling function invokes another function (referred to as the called function). Specifically, when the calling function invokes the called function, the called function's prologue portion stores information pertaining to the state of the calling function in the register save area 412 of the fixed part 404. The function state information which is stored in the register save area 412 includes data contained in one or more of the registers 611 that were being used by the calling function, as well as the return address of the calling function.

The fixed part 404 also includes a next available byte (NAB) pointer field 414 which stores the address (called the next available byte pointer) of the byte in the invocation stack that immediately follows the stack frame 402 (more particularly, the byte in the invocation stack that immediately follows the variable part 406 of the stack frame 402). Note that the NAB pointer field 414 essentially performs the same function as the forward stack frame pointer field 410. Thus, in one embodiment of the present invention, the forward stack frame pointer field 410 is not used.

The variable part 406 of the stack frame 402 is used to store the dynamic variables of the function associated with the stack frame 402. Dynamic variables are temporary variables that exist only during the execution of the function.

As indicated above, the fixed part 404 has a predetermined, fixed length. This length of the fixed part 404 is equal to the fixed sizes of the backward stack frame pointer field 408, the forward stack frame pointer field 410, the register save area 412, and the next available byte pointer field 414. As will be appreciated, different computer systems may assign different sizes to these fields 408, 410, 412, and 414 of the fixed part 404 (for example, the size of pointers may vary among computer systems). Thus, while in any one computer system the fixed part 404 of every stack frame 402 has a predetermined fixed length, the value of this predetermined fixed length is implementation dependent and may vary from one computer system to another. Preferably, the predetermined fixed length of the fixed part 404 is equal to 128 bytes.

As indicated above, the length of the variable part 406 varies from function to function. This is the case, since different functions have different dynamic variable storage requirements.

Figure 5:
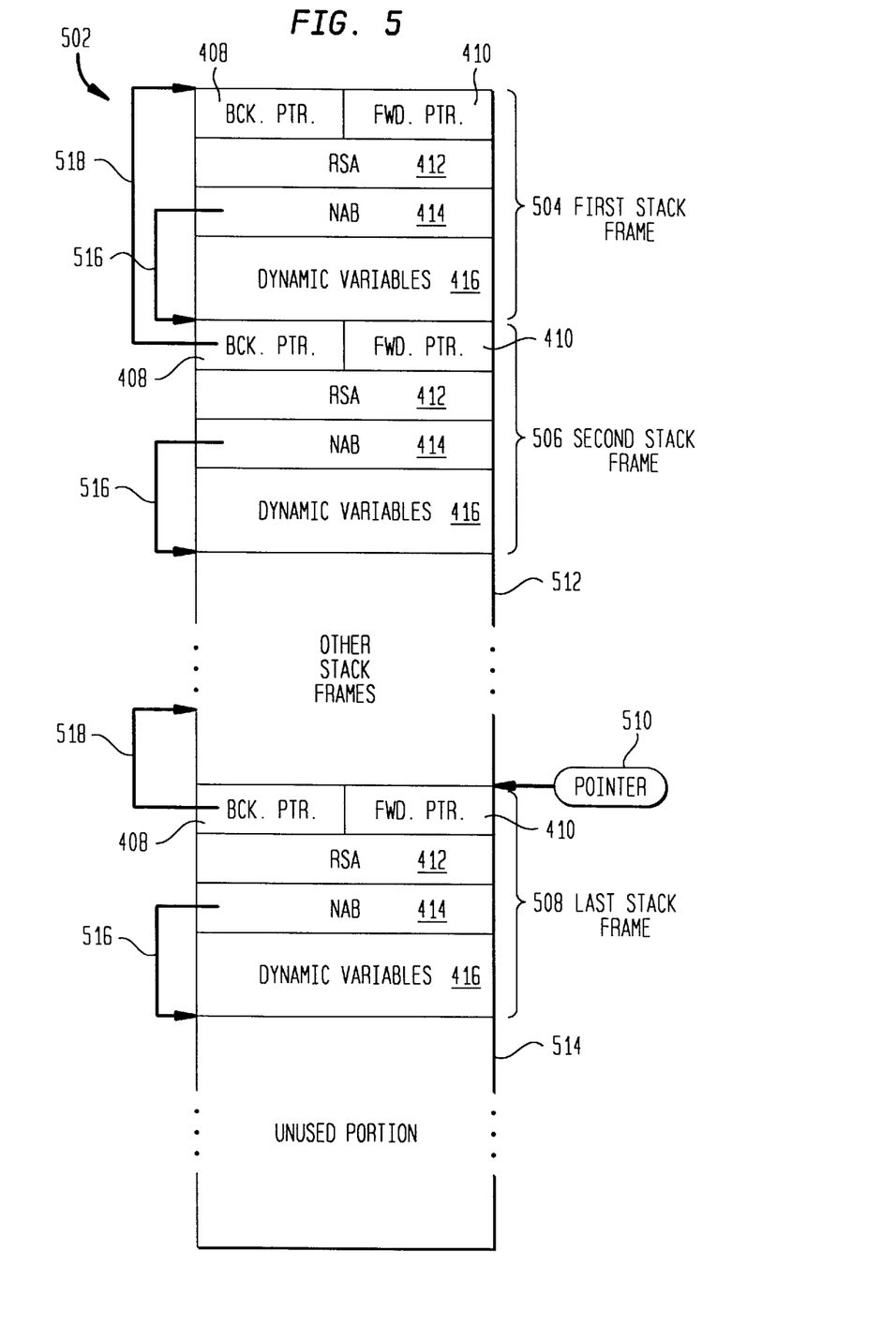
FIG. 5 illustrates the detailed format of an invocation stack according to a preferred embodiment of the present invention.

FIG. 5 depicts an example invocation stack 502 having stack frames 504, 506, 508, 512. Stack frame 508 is at the top of the invocation stack 502, as indicated by stack pointer 510. Unused portions of the invocation stack 502 are indicated as 514.

Note that the invocation stack 502 in FIG. 5 is shown as growing from the top of the page to the bottom, whereas other invocation stacks shown elsewhere (such as in FIGS. 1B, 1D, and 3A–3D) are shown as growing from the bottom of the page to the top. Such differences in convention are provided to show the different ways in which stacks may be represented.

The stack frames 504, 506, 508, 512 have the same format as the stack frame 402 shown in FIG. 4. That is, the stack frames 504, 506, 508, 512 each have a fixed part 404 and a variable part 406, wherein the fixed part 404 includes a backward stack frame pointer field 408, a forward stack frame pointer field 410, a register save area 412, and a next available byte pointer field 414.

The interconnection among stack frames in an invocation stack is illustrated in FIG. 5. specifically, the backward stack frame pointer field 408 in each stack frame 504, 506, 508, 512 stores a backward pointer 518 which points to the preceding stack frame. The next available byte (NAB) pointer field 414 in each stack frame 504, 506, 508, 512 stores a next available byte pointer 516 that points to the byte in the invocation stack that immediately follows the respective stack frame 504, 506, 508, or 512.

The operation of a typical prologue portion of a function shall now be described with reference to a flowchart 702 in FIG. 7. When one function (referred to as the calling function) invokes another function (referred to as the called function), the prologue portion in the called function performs the steps of the flowchart 702. The flowchart 702 begins with step 704, where control immediately passes to step 706.

In step 706, the prologue portion of the called function saves information pertaining to the state of the calling function in the calling function's stack frame.

In steps 708, 710, and 712, the prologue portion creates a new stack frame in the invocation stack for the called function. In particular, in step 708 the prologue portion determines what the size (that is, the length) of the variable part 406 of this new stack frame must be. In other words, during step 708 the prologue portion determines what the length of the variable part 406 of the new stack frame must be in order to satisfy the dynamic variable storage requirements of the called function. The prologue portion stores this length value in one of the registers 611 of the computer system 602.

Procedures for determining the dynamic variable storage requirements of functions are well known. For example, the compiler preferably determines the amount of storage required to contain a function's dynamic variables. It saves this information at a fixed offset into the signature of the function. The signature is directly addressable by the prologue portion in step 708.

After performing step 708, the prologue portion in step 710 determines the address of the next available byte of storage on the invocation stack. In other words, during step 710 the prologue portion determines the address of the first unused byte of storage that follows the stack frame that is at the top of the invocation stack. The prologue portion stores this address in another one of the registers 611 of the computer system 602. With reference to FIG. 5, for example, during step 710 the prologue portion refers to the next available byte field 414 in the stack frame 508 at the top of the invocation stack 502 (as indicated by the stack pointer 510) to obtain the address of the next available byte of storage on the invocation stack 502.

After performing step 710, the prologue portion in step 712 creates a new stack frame for the called function starting from the first unused byte of storage in the invocation stack as identified by the next available byte address determined in step 708. The size of the new stack frame is based on the variable part length determined by the prologue portion in step 708. Performance of the flowchart 702 is complete after step 712 is executed, as indicated by step 714.

The manner in which the prologue portion performs step 712 shall now be described with reference to a flowchart 802 in FIG. 8. The flowchart 802 starts with step 804, where control immediately passes to step 806.

In step 806, the prologue portion stores the starting address of the calling function's stack frame in the backward stack frame pointer field 408 of the new stack frame of the called function. In this manner, the prologue portion links the new stack frame to the preceding stack frame in the invocation stack. The prologue portion preferably performs step 806 by copying the value of the stack pointer into the backward stack frame pointer field 408 of the new stack frame (at this point, the stack pointer has not been updated, so it still indicates that the calling function's stack frame is at the top of the invocation stack).

After performing step 806, the prologue portion in step 808 calculates the address of the byte in the invocation stack that will represent the next available byte (that is, the first unused byte in the invocation stack) after the called function's new stack frame has been completely generated. This address is stored in the next available byte pointer field 414 of the new stack frame. The prologue portion performs step 808 by adding the length of the new stack frame's variable part 406 and the predetermined, fixed length of the new stack frame's fixed part 404 to the starting address of the new stack frame. Recall that the length of the new stack frame's variable part 406 was determined in step 708, and the starting address of the new stack frame was determined in step 710.

After performing step 808, the prologue portion in step 810 updates the stack pointer to point to the called function's stack frame. In this manner, the prologue portion causes the called function's stack frame to be the top of the invocation stack. The update of the stack pointer in step 808 is performed in a single instruction, such that it represents an atomic operation (that is, the modification of the stack pointer to point to the called function's stack frame cannot be interrupted). Performance of the flowchart 802 is complete after step 810 is executed, as indicated by step 812. More importantly, after step 810 is executed, generation of the called function's stack frame is complete.

There are three features of the operation of the prologue portion that are particularly relevant to the present invention. First, the prologue portion updates fields in only the fixed part 404 of the new stack frame. Second, the prologue portion modifies the stack pointer to point to the new stack frame only after the prologue portion has completed its updates to the new stack frame. Third, the modification of the stack pointer to point to the new stack frame is an atomic operation. The relevance of these features to the present invention will become apparent from the discussion below.

4. Operation of the Present Invention

As discussed above, the interrupt handling module 622 of the present invention processes asynchronous events (such as POSIX asynchronous signals) such that the prologue portions of functions may be asynchronously interrupted without destroying the stack frames which were being created by the prologue portions before their interruption.

As discussed above, asynchronous interrupts are handled by interrupt service routines (ISR). It is assumed by the present invention that interrupt service routines cannot themselves be interrupted.

When an interrupt service routine is invoked, a stack frame must be created in the invocation stack for its use. As discussed above, the creation of an ISR's stack frame may destroy a partially completed stack frame in the invocation stack if the ISR pertains to an asynchronous event which interrupted the processing of a function's prologue portion.

According to the present invention, the interrupt handling module 622 creates stack frames in the invocation stack for use by interrupt service routines. The interrupt handling module 622 creates such ISR stack frames without destroying any partially completed stack frame that may exist in the invocation stack.

The operation of the interrupt handling module 622 is described below with reference to a scenario shown in FIG. 11. In this scenario, a thread 1102 is conceptually interrupted by an asynchronous interrupt 1104 (element 1102 could alternatively represent a single function invocation that is part of a thread). Such interruption of the thread 1102 causes control to be passed to the interrupt handling module 622 of the present invention, as indicated by control line 1108.

An interrupt service routine (ISR) 1106 is defined as being responsible for processing the asynchronous interrupt 1104. This ISR may be user defined, may be defined by an applicable computer programming language standard, or may be defined by an applicable operating system interface standard (such as POSIX).

As discussed in detail below, the interrupt handling module 622 creates a new stack frame in the invocation stack for use by the ISR 1106. Nominally, the interrupt handling module 622 then invokes the ISR 1106 to process the interrupt 1104, as indicated by control line 1112. Further details of the scenario of FIG. 11 are discussed below.

The manner in which the interrupt handling module 622 processes asynchronous interrupts, and specifically the asynchronous interrupt 1104 of FIG. 11, shall now be described with reference to a flowchart 902 shown in FIG. 9. This flowchart 902 is of sufficient detail to enable one skilled in the relevant art to generate a computer program or a computer program product in accordance with the present invention. The flowchart 902 begins with step 904, where control immediately passes to step 906.

In step 906, the interrupt handling module 622 determines the address of the next available unused byte of storage in the invocation stack. The interrupt handling module 622 preferably performs step 906 by referring to the next available byte pointer field 414 in the stack frame associated with the thread 1102 that is at the top of the invocation stack.

Figure 10A:
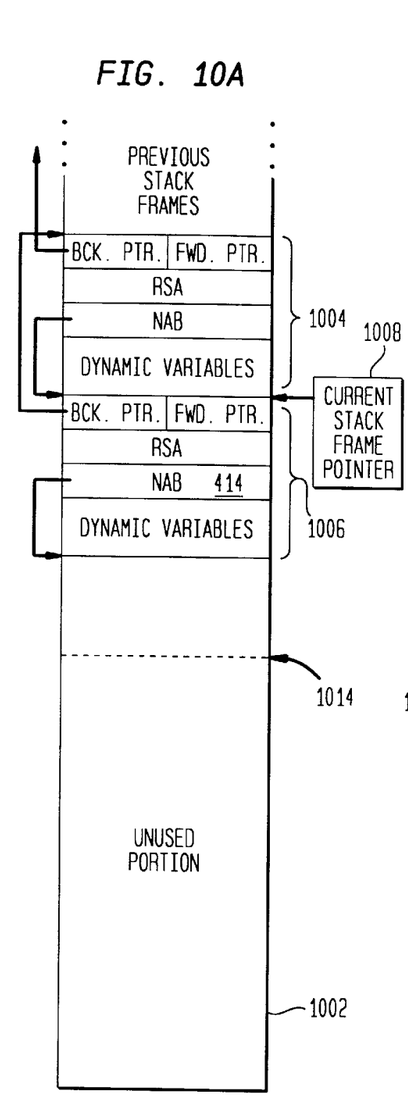
FIGS. 10A–10C and 11 illustrate various scenarios involving invocation stacks and are used to describe the flowchart of FIG. 9.

Consider an invocation stack 1002 in FIG. 10A, for example. This invocation stack 1002 includes a number of stack frames, such as stack frames 1004 and 1006. These stack frames 1004, 1006 have the same format as the stack frame 402 in FIG. 4, although for readability purposes reference numerals are provided for only those elements of the stack frames 1004, 1006 that are pertinent to the present discussion. Stack frame 1006 is at the top of the invocation stack 1002, as indicated by a stack pointer 1008. This stack frame 1006 is associated with the thread 1102.

When the thread 1102 is interrupted by the asynchronous interrupt 1104, the interrupt handling module 622 preferably performs step 906 by referring to the next available byte pointer field 414 in the stack frame at the top of the invocation stack 1002, that is, stack frame 1006.

Figure 10B:
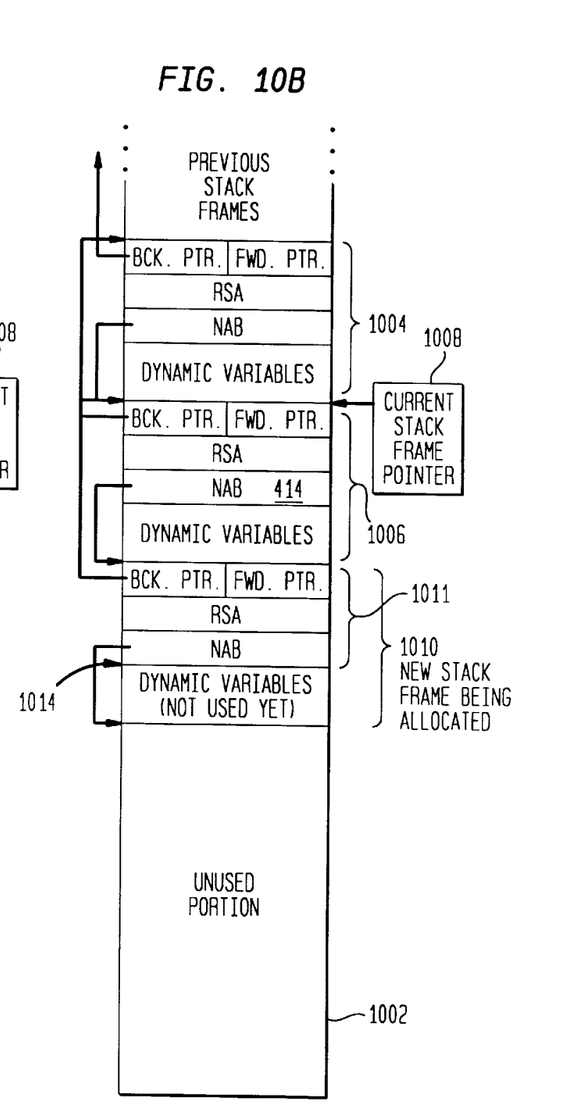

Consider now FIG. 10B, which shows the invocation stack 1002 from FIG. 10A. The invocation stack 1002 in FIG. 10B has been modified to include a stack frame 1010 that is only partially completed. Assume that this stack frame 1010 is in the process of being created by the prologue portion of the thread 1102 (thus, in the scenario of FIG. 10B, the thread 1102 is associated with the stack frame 1010, rather than the stack frame 1006). The fixed part of this partially completed stack frame 1010 is denoted by reference numeral 1011. Stack frame 1010 is not at the top of the invocation stack 1002 since the stack pointer 1008 is modified to point to the stack frame 1010 only once the stack frame 1010 is completed. Rather, stack frame 1006 is at the top of the invocation stack 1002.

Assume that the asynchronous interrupt 1104 interrupts the prologue portion of the thread 1102. In the scenario of FIG. 10B, as in the scenario of FIG. 10A, the interrupt handling module 622 preferably performs step 906 by referring to the next available byte pointer field 414 in the stack frame at the top of the invocation stack 1002, that is, stack frame 1006.

After performing step 906, the interrupt handling module 622 in step 908 calculates the starting address of a new stack frame which it will subsequently create. This new stack frame will be used by the interrupt service routine 1106 while processing the asynchronous interrupt 1104.

The interrupt handling module 622 preferably performs step 908 by adding a predetermined "skip" value to the next available byte address (determined in step 906) to obtain the starting address of the new stack frame. This predetermined "skip" value is preferably set equal to the size of a stack frame's fixed part 404. Alternative, the predetermined "skip" value is set equal to a value that is greater than the size of a stack frame's fixed part 404. Thus, the interrupt handling module 622 ensures that the ISR's stack frame does not overwrite the fixed part 404 of any partially completed stack frame that may exist in the invocation stack.

Consider, for example, the scenario presented in FIG. 10B wherein the prologue portion of the thread 1102 is interrupted by the asynchronous interrupt 1104. The new stack frame's starting address that the interrupt handling module 622 calculates in step 908 points to a memory location (represented by 1014) that follows the fixed part 1011 of the partially completed stack frame 1010. Thus, the new stack frame that is created by the interrupt handling module 622 in step 910 (discussed below) starting from this starting address "skips" over the fixed part 1011 of the partially completed stack frame 1010. That is, this fixed part 1011 is not overwritten by the ISR's stack frame.

Consider now the scenario presented in FIG. 10A wherein the thread 1102 is associated with the fully completed stack frame 1006. In the scenario of FIG. 10A, as in the scenario of FIG. 10B, the interrupt handling module 622 performs step 908 by adding the predetermined "skip" value to the next available byte address (determined in step 906) to obtain the starting address of the new stack frame. This starting address of the new stack frame points to a memory location (represented by 1014) that is displaced from the end of the stack frame 1006 by a value that is equal to the predetermined "skip" value. Memory between the stack frame 1006 and the ISR's stack frame (which the interrupt handling module 622 creates in step 910, discussed below) is not used.

This illustrates a significant feature of the present invention. Specifically, when processing an asynchronous interrupt, the interrupt handling module 622 does not attempt to determine whether the asynchronous interrupt 1104 occurred during the processing of the prologue portion of the thread 1102. Instead, the interrupt handling module 622 performs the steps of the flowchart 902 in FIG. 9 for all asynchronous interrupts.

This approach is advantageous as it does not require the expenditure of processing time and resources to determine whether the asynchronous interrupt occurred during the processing of the interrupted function's prologue portion. Also, any adverse impact on memory utilization of the invocation stack 1002 is minimal since the amount of unused memory between the ISR stack frame and the preceding stack frame is small, and in any case the ISR stack frame is removed from the invocation stack 1002 after termination of the ISR 1106.

Referring again to FIG. 9, after processing step 908, the interrupt handling module 622 in step 910 creates a new stack frame for use by the interrupt service routine. This new stack frame is allocated memory in the invocation stack starting from the starting address calculated in step 908.

Figure 7:
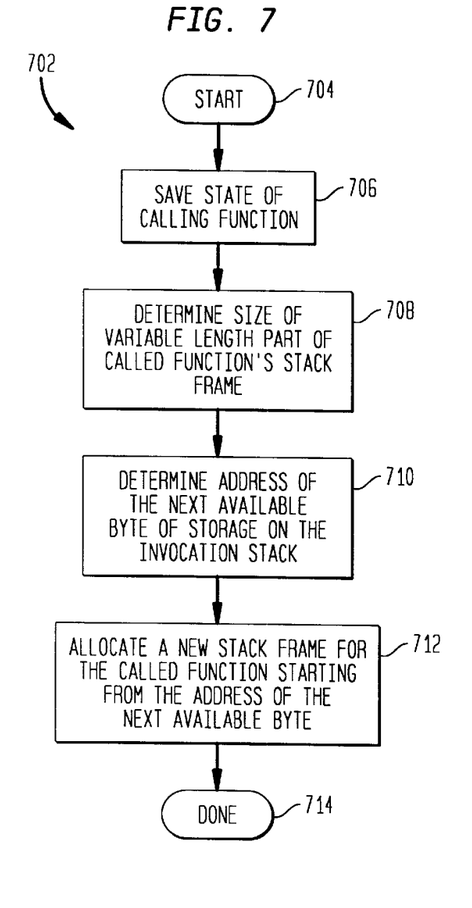
FIGS. 7 and 8 are flowcharts depicting the operation of a prologue portion of a function according to a preferred embodiment of the present invention.
Figure 8:
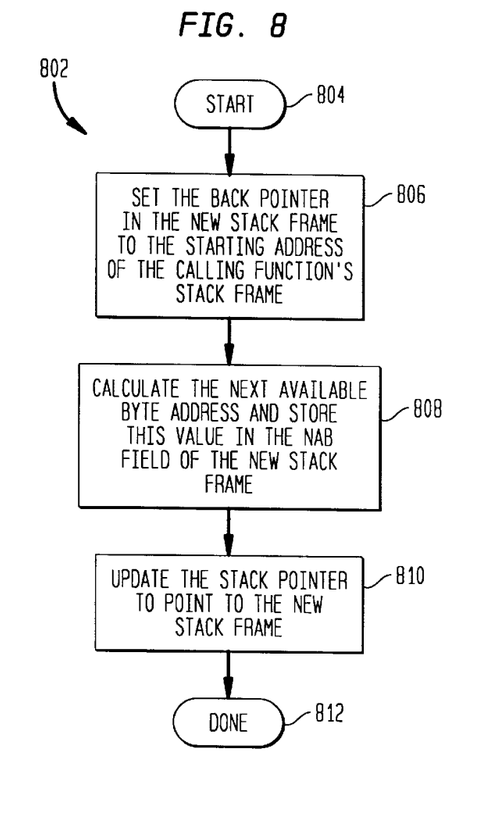
Figure 9:
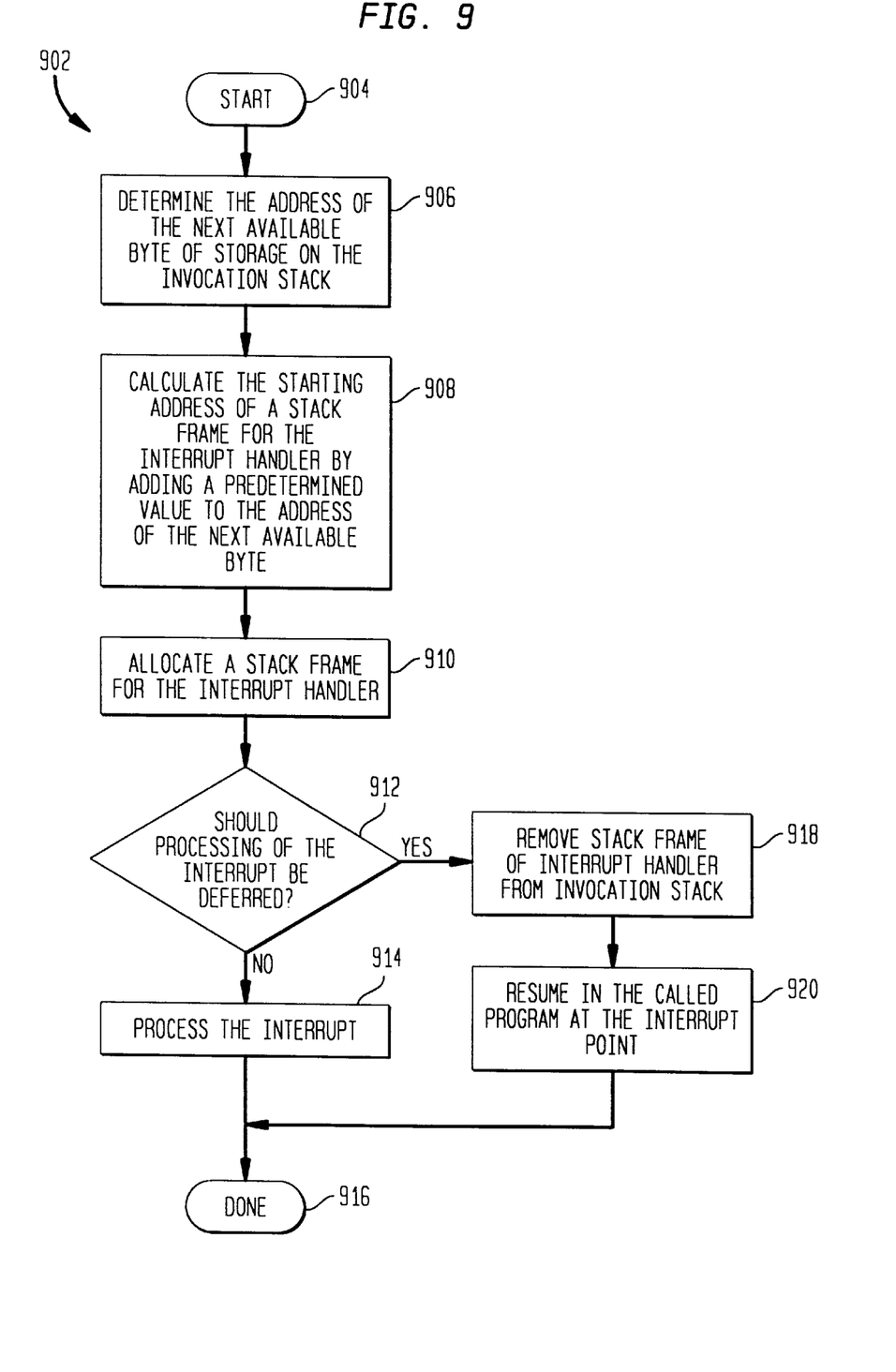
FIG. 9 is a flowchart depicting the operation of an interrupt handling module according to a preferred embodiment of the present invention.

The manner in which the interrupt handling module 622 creates the new stack frame in step 910 is similar to the manner in which a prologue portion creates a new stack frame, as represented by steps 708 and 712 in the flowchart 702 of FIG. 7 (note that, with regard to the interrupt handling module 622, steps 906 and 908 in FIG. 9 essentially replace step 710 in FIG. 7), and steps 806, 808, and 810 in the flowchart 802 of FIG. 8. Such operation by the interrupt handling module 622 in step 910 includes modifying the stack pointer to point to the new stack frame (this is similar to the operation of a prologue portion in step 810 of FIG. 8).

Consider, for example, the scenario presented in FIG. 10B wherein the prologue portion of the thread 1102 is interrupted by the asynchronous interrupt 1104 being considered. As discussed above, the new stack frame's starting address that the interrupt handling module 622 calculates in step 908 points to a memory location (represented by 1014) that follows the fixed part 1011 of the partially completed stack frame 1010. In step 910, the interrupt handling module 622 creates a new stack frame 1012 for use by the interrupt service routine 1106 (this is shown in FIG. 10C). This new stack frame 1012 is allocated memory in the invocation stack 1002 starting from the starting address (calculated in step 908) that points to memory location 1014.

Note that the backward pointer 518 stored in the backward stack frame pointer field 408 of the new stack frame 1012 points to stack frame 1006, rather than the stack frame 1011. This is the case, since the stack pointer 1008 was pointing to the stack frame 1006 when the interrupt handling module 622 initialized the value of the backward pointer 518 (such operation by the interrupt handling module 622 is performed in a step similar to step 806 in FIG. 8). Also note that the interrupt handling module 622 has also modified the stack pointer 1008 to point to the new stack frame 1012.

Referring again to FIG. 9, after the interrupt handling module 622 has completed step 910, the new stack frame for the interrupt service routine has been completed. Thereafter, the interrupt handling routine 622 performs step 912.

In step 912, the interrupt handling routine 622 determines whether the thread 1102 was interrupted by the asynchronous interrupt 1104 at a critical time. If the thread 1102 was interrupted while at a critical time, then the interrupt handling routine 622 determines that processing of the interrupt 1104 should be deferred to a later time. Otherwise, the interrupt handling routine 622 determines that the interrupt 1104 should be processed immediately.

For example, suppose that the thread 1102 includes the following pseudocode segment:

Memory Location X←A; Instruction 1
B←Memory Location X; Instruction 2

Memory location X represents a storage location in the RAM 608. Instruction 1 operates to store the value from variable A into memory location X. Instruction 2 operates to set the variable B equal to the value in memory location X. Assume that the thread 1102 is interrupted by the asynchronous interrupt 1104 just after executing instruction 1. The RAM 608 will not be in a consistent state if the interrupt service routine 1106 modifies memory location X. This is the case, since Instruction 2 of the thread 1102 is expecting the value of variable A to be stored in memory location X.

Thus, in this example, the asynchronous interrupt 1104 interrupted the thread 1102 at a critical time. This is the case, since immediate processing of the interrupt 1104 could possibly result in inconsistency of the RAM 608. Thus, in this example, the interrupt handling module 622 would determine in step 912 that processing of the interrupt 1104 should be deferred to a later time.

Further details regarding the manner in which the interrupt handling module 622 determines whether the processing of asynchronous interrupts should be deferred, and the manner in which the interrupt handling module 622 ensures that such deferred interrupts are processed at a later time, are discussed in an U.S. Patent Application entitled "System and Method for Safing of Asynchronous Interrupts", cited above.

If, in step 912, the interrupt handling module 622 determines that the interrupt 1104 should be processed at a later time, then step 918 is performed. In step 918, the interrupt handling module 622 removes the stack frame associated with the interrupt service routine 1106 from the invocation stack. The interrupt handling module 622 performs step 912 by modifying the stack pointer to point to the preceding fully completed stack frame. For example, in the scenario presented in FIG. 10C, the interrupt handling module 622 modifies the stack pointer 1008 to point to the stack frame 1006.

After performing step 918, the interrupt handling module 622 in step 920 causes the interrupted thread 1102 to resume execution at the point at which it was interrupted. This is indicated by control line 1110 in FIG. 11. Note that, if the interrupt handling module 622 determines in step 912 that the interrupt 1104 should be processed at a later time, then the ISR 1106 is not invoked until a later time. The operation of the interrupt handling module 622 according to the flowchart 902 is complete after performing step 920, as indicated by step 916.

Figures 10C, 11:
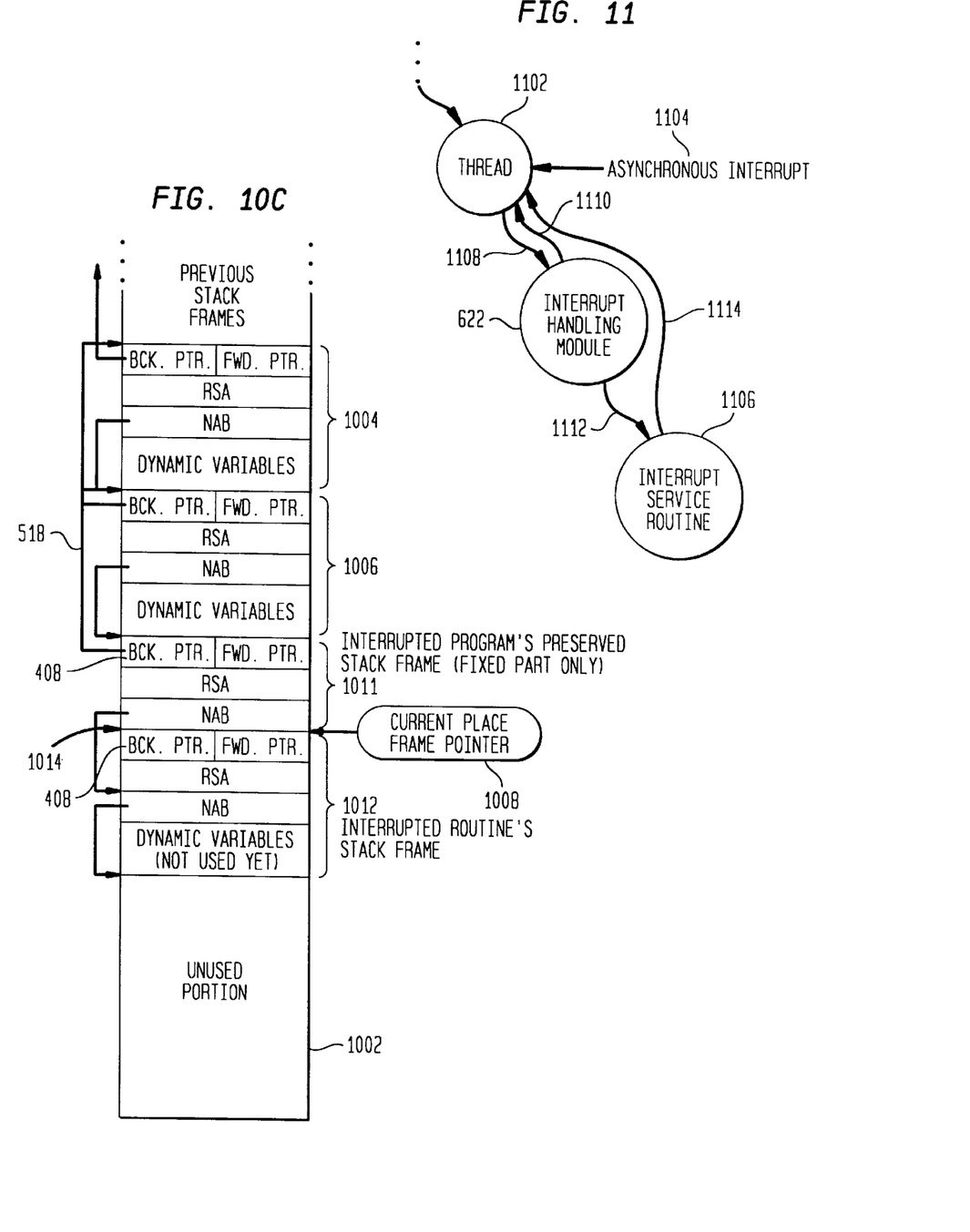

Referring to the scenario presented in FIG. 10C, upon resuming execution of the thread 1102, the thread's prologue portion resumes its generation of the stack frame 1010. Such operation by the prologue portion is possible since, according to the present invention, prologue portions update only those fields in the fixed part 404 of new stack frames, and since the fixed part 1011 of the stack frame 1010 was not destroyed when the ISR's stack frame 1012 was created.

Referring back to step 912, if the interrupt handling module 622 determines in step 912 that the interrupt 1104 should be processed immediately (that is, that the interrupt should not be deferred), then step 914 is performed. In step 914, the interrupt handling module 622 invokes the interrupt service routine 1106, as indicated by control line 1106 in FIG. 11. The operation of the interrupt handling module 622 according to the flowchart 902 is complete after performing step 914, as indicated by step 916.

Once it is invoked, the interrupt service routine 1106 processes the interrupt 1104. Thereafter, execution of the thread 1102 resumes at the point at which it was executed, as indicated by control line 1114 in FIG. 11.

As discussed above, according to the present invention the interrupt handling module 622 processes asynchronous interrupts such that prologue portions of functions may be asynchronously interrupted without destroying the stack frames being created by the prologue portions. Such "safe" processing of asynchronous interrupts by the present invention shall be further illustrated by considering the effect of interrupting each step of a function's prologue portion pertaining to the creating of a new stack frame.

Referring to FIG. 7, assume that the prologue portion is interrupted after executing step 708 or 710. As discussed above, the prologue portion in step 708 stores the variable part length in one of the registers 611 of the computer system 602. Also, in step 710 the prologue portion stores the next available byte address in another one of the registers 611. These registers are saved by the operating system. When the operating system delivers an interrupt to the interrupt handling module 622, it passes a data structure that contains the values of all of the interrupted program's registers. Also passed in this data structure is the return address and interrupt type. This data structure is not part of any stack, but instead comes from system storage. Thus, steps 708 and 710 are safe from asynchronous interrupts.

Consider now steps 806, 808, and 810 in FIG. 8, which represent the operation of the interrupt handling module 622 while processing step 712 of FIG. 7. Assume that the prologue portion is interrupted after executing step 806 or 808. As discussed above, in step 806 the prologue portion stores the starting address of the calling function's stack frame in the backward stack frame pointer field 408 of the fixed part 404 of the new stack frame. In step 808, the prologue portion stores the next available byte address in the next available byte pointer field 414 of the fixed part 404 of the new stack frame. The creation of the stack frame for use by the interrupt service routine does not overwrite the fixed part 404 of the interrupted function's partially completed stack frame. Thus, steps 806 and 808 are safe from asynchronous interrupts.

Assume that the prologue portion is interrupted after executing step 810. After step 810, the interrupted function's stack frame is complete. Also, step 810 cannot itself be interrupted since it is an atomic operation, as indicated above. Thus, step 810 is safe from asynchronous interrupts.

According to an alternate embodiment of the present invention, the present invention represents a computer program product that includes a computer readable medium having computer program logic recorded thereon. The computer program logic enables a computer system to process asynchronous interrupts such that prologue portions of functions in a computer program may be asynchronously interrupted without compromising the invocation stack associated with the computer program, as discussed above.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A method of processing in a computer system maintaining an invocation stack for one or more calling functions and one or more called functions, wherein each of said calling functions accesses one of said called functions to perform one or more computer-related processes, wherein said invocation stack comprises a plurality of stack frames, each of said stack frames representing a calling function or a called function and including a fixed part of a predetermined length and a variable part of a variable length, said method comprising the steps of:

(1) saving by a prologue portion of a called function information relating to a state of a calling function in a register save area of the calling function;

(2) accessing by the prologue portion of the called function a portion of memory to determine the length of the variable part of a new stack frame of the called function based upon the dynamic variable storage requirement for the called function;

(3) determining by the prologue portion of the called function a next available byte of storage on said invocation stack by adding the length of the fixed part of the new stack frame and the length of the variable part of the new stack frame to a starting address of the new stack frame;

(4) creating by the prologue portion of the called function said new stack frame for the called function, step (4) comprising the steps of:

(i) linking the new stack frame of the called function to the stack frame of the calling function by setting a backward stack frame pointer of the new stack frame to a starting address of the stack frame of the calling function;

(ii) linking the new stack frame of the called function to a new storage area on the invocation stack by setting a next available byte pointer of the new stack frame to said determined next available byte of storage; and (iii) updating a stack pointer to point to said next available byte of storage on the invocation stack;

wherein, if an asynchronous interrupt is invoked, then the method further comprises the steps of:

(5) passing processing control to an interrupt handling module; and (6) creating by said interrupt handling module an interrupt stack frame on the invocation stack for an interrupt service routine, step (6) comprising:

(i) determining a starting address in the invocation stack for the interrupt stack frame by adding a predetermined "skip" value to a next available byte of storage pointed to by the stack pointer;

(ii) updating the stack pointer to point to the starting address of the interrupt stack frame; and (iii) creating the interrupt stack frame by allocating a portion of the invocation stack starting from the starting address for the interrupt stack frame.

2. The method of claim 1, wherein said predetermined "skip" value is equal to the length of the fixed part of the new stack frame of the called function.

3. The method of claim 1, wherein said predetermined "skip" value is equal to or greater than the fixed part of the new stack frame of the called function.

4. The method of claim 1, wherein if said interrupt handling module determines that the called function was interrupted during a critical time, then said interrupt handling module defers processing of the interrupt to a later point in time.

5. The method of claim 4, wherein the interrupt handling module defers processing if immediate processing of said asynchronous interrupt may result in an inconsistency in a RAM associated with said processing.

6. The method of claim 1, wherein after processing of the asynchronous interrupt is completed, processing control is passed to a prologue portion of a called function whose stack frame generation process was interrupted by said asynchronous interrupt.

7. The method of claim 6 wherein said interrupted prologue portion of said called function resumes stack frame generation.

8. The method of claim 1, wherein the asynchronous interrupt represents an asynchronous signal defined by a Portable Operating System Interface (POSIX) standard.

9. A system for processing in a computer system that maintains an invocation stack for one or more calling functions and one or more called functions, wherein each of said calling functions accesses one of said called functions to perform one or more computer-related processes, wherein said invocation stack comprises a plurality of stack frames, each of said stack frames representing a calling function or a called function and including a fixed part of a predetermined length and a variable part of a variable length, said system comprising:

means for saving information relating to a state of a calling function in a register save area of the calling function;

means for accessing a portion of memory to determine the length of the variable part of a new stack frame of the called function based upon the dynamic variable storage requirement for the called function;

means for determining a next available byte of storage on said invocation stack by adding the length of the fixed part of the new stack frame and the length of the variable part of the new stack frame to a starting address of the new stack frame;

means for creating said new stack frame for the called function, said means for creating said new stack frame comprising:

means for linking the new stack frame of the called function to the stack frame of the calling function by setting a backward stack frame pointer of the new stack frame to a starting address of the stack frame of the calling function;

means for linking the new stack frame of the called function to a new storage area on the invocation stack by setting a next available byte pointer of the new stack frame to said determined next available byte of storage; and means for updating a stack pointer to point to said next available byte of storage on the invocation stack;

passing processing control means for passing processing control to an interrupt handling module if an asynchronous interrupt is invoked;

means responsive to said asynchronous interrupt invocation for creating an interrupt stack frame on the invocation stack for an interrupt service routine, said means for creating said interrupt stack frame comprising:

means for determining a starting address in the invocation stack for the interrupt stack frame by adding a predetermined "skip" value to a next available byte of storage pointed to by the stack pointer;

means for updating the stack pointer to point to the starting address of the interrupt stack frame; and means for creating the interrupt stack frame by allocating a portion of the invocation stack starting from the starting address for the interrupt stack frame.

10. The system of claim 9, wherein said predetermined "skip" value is equal to the length of the fixed part of the new stack frame of the called function.

11. The system of claim 9, wherein said predetermined "skip" value is equal to or greater than the fixed part of the new stack frame of the called function.

12. The system of claim 9, wherein if said interrupt handling module determines that the called function was interrupted during a critical time, then said interrupt handling module defers processing of the interrupt to a later point in time.

13. The system of claim 12, wherein the interrupt handling module defers processing if immediate processing of said asynchronous interrupt may result in an inconsistency in a RAM associated with said processing.

14. The system of claim 9, wherein after processing of the asynchronous interrupt is completed, processing control is passed to a prologue portion of a called function whose stack frame generation process was interrupted by said asynchronous interrupt.

15. The system of claim 14, wherein said interrupted prologue portion of said called function resumes stack frame generation.

16. The system of claim 9, wherein the asynchronous interrupt represents an asynchronous signal defined by a Portable Operating System Interface (POSIX) standard.

* * * * *